(12) United States Patent
Clark

(10) Patent No.: US 6,254,982 B1
(45) Date of Patent: Jul. 3, 2001

(54) GRAPHITE BURSTING DISC

(75) Inventor: Richard Nicholas Clark, Beauchief (GB)

(73) Assignee: Zook Enterprises, LLC, Chagrin Falls, OH (US)

( * ) Notice: Subject to any disclaimer, the term of this patent is extended or adjusted under 35 U.S.C. 154(b) by 0 days.

(21) Appl. No.: 08/875,653

(22) PCT Filed: Nov. 28, 1996

(86) PCT No.: PCT/GB96/02949

§ 371 Date: Jul. 29, 1997

§ 102(e) Date: Jul. 29, 1997

(87) PCT Pub. No.: WO97/20159

PCT Pub. Date: Jun. 5, 1997

(30) Foreign Application Priority Data

Nov. 29, 1995 (GB) .................................... 9524415
Sep. 17, 1996 (GB) .................................... 9619341

(51) Int. Cl.[7] .............. B05D 3/02; B32B 27/06; B65D 90/36; F16K 17/14
(52) U.S. Cl. ............ 428/332; 137/68.19; 220/89.2; 251/368; 428/421; 428/422; 427/133; 427/195; 427/375; 427/385.5; 427/393.6

(58) Field of Search ............... 137/68.19, 68.21, 137/68.22, 68.23, 68.24, 68.25, 68.26, 68.27, 68.28, 68.29, 68.3; 220/89.2, 89.3; 251/368; 428/421, 422, 332, 336, 307.3; 427/375, 385.5, 393.6, 195, 133

(56) References Cited

U.S. PATENT DOCUMENTS 4,102,469 * 7/1978 Shegrund et al. ............... 220/89.2
4,631,200 * 12/1986 Bierschenk ..................... 427/113
5,012,945   5/1991 Kennan ......................... 220/89.1

FOREIGN PATENT DOCUMENTS 2 143 939    3/1973 (DE) ............... F16K/17/40
1.466.386   12/1966 (FR) .
  909379  * 10/1962 (GB) .
WO93/21616 * 10/1993 (WO) .

* cited by examiner

Primary Examiner—Paul Thibodeau
Assistant Examiner—Ramsey Zacharia
(74) Attorney, Agent, or Firm—Watts, Hoffman, Fisher & Heinke, Co., L.P.A.

(57) ABSTRACT

A pressure relief device comprises an unimpregnated graphite membrane having a gas impermeable coating.

14 Claims, 2 Drawing Sheets

GRAPHITE BURSTING DISC

CROSS-REFERENCES TO RELATED APPLICATIONS

The present application is a 371 of PCT/GT96/02949 filed Nov. 28, 1996.

BACKGROUND OF THE INVENTION

1. Field of the Invention

The present invention relates to bursting discs, and particularly although not exclusively to graphite bursting discs of the type used in the pharmaceutical preparation and chemical industries.

2. Description of Prior Art

It is well known in the chemical engineering and pharmaceutical industries to provide pressure relief devices for protecting pressure systems from over pressurization. One such pressure relief device is the known bursting disc, which comprises a substantially planar disc of graphite material which is installed at a suitable location in the pressurized system. When the pressure at one side of the disc rises above a predetermined design pressure, the graphite disc ruptures thereby releasing pressure from the system. One such typical application is on reaction vessels and chambers. In this case, the disc is attached to a flanged pipe outlet of a reaction chamber so that when the pressure in the reaction chamber rises above a predetermined design pressure, the graphite disc ruptures, releasing pressure in the reaction chamber.

Known bursting discs are of two types, the mono block type which is a singular item machined from a solid block of graphite and which has a peripheral outer ring 2 of graphite, and a thinner graphite membrane 4 extending across the ring, as shown in cut away bisected view in FIG. 1 of the accompanying drawings. Another type is the replacement element type bursting disc which comprises a circular graphite membrane in the form of a replaceable wafer disc, and a two part holder device into which the graphite membrane is arranged to fit. A cut away bisected view of a typical replacement type membrane is shown in FIG. 2 and comprises the membrane 6 and a ring gasket 8 on either side thereof.

Either type, is installed between pipework flanges. When the membrane ruptures or fractures, it relieves pressure from the reaction chamber or other pressurized installation.

In each type in order to create a differential pressure between one side of the bursting disc which faces the inside of the reaction chamber, and the other side of the bursting disc, which typically may lead to a venting pipe, the disc must create a gas impermeable barrier. As the graphite in its basic form is porous, to produce an effective bursting disc it is necessary to modify the graphite to make the membrane impermeable. If the graphite is porous, the response time of the disc to changes in differential pressure on opposite sides of the disc is poor, and the disc may fail to burst at all, or not burst quickly or at the correct pressure.

Conventionally, the graphite is impregnated with a thermo-setting resin, such as phenolics, PTFE polytetrafluoroethylene emulsions or a furanic resin.

Impregnation with such resins creates an impermeable bursting disc that gives a rapid bursting response as soon as the differential pressure between sides reaches a predetermined design pressure.

However, the resin impregnated graphite bursting disc is limited in operating temperature by the temperature at which the phenolic and furanic resins dissociate from the graphite. Typically such dissociation occurs at around 200° C. and consequently, for constant operation of reactions at greater than 200° C., known graphite bursting discs are unreliable. At such temperatures, small pores of resin dissociate from the graphite and the graphite becomes porous, leading to reduced bursting performance and contamination of the reaction chamber with resin debris.

Typically, known graphite bursting discs are used for reactions which occur at temperatures up to 165° C.

It is also known to provide impregnated graphite bursting discs with a polytetrafluoroethylene (PTFE) coating or fluoropolymer liner to provide additional corrosion protection. However, such coated or lined impregnated discs are limited in operating temperature due to the impregnated graphite as described above and are only effective for use at temperatures up to 165° C. Furthermore the coatings are porous and not impermeable to gas so that their use is only effective with impregnated or non-porous graphite.

SUMMARY OF THE INVENTION

The inventors of the present invention have found experimentally, that improvements to a graphite bursting membrane are possible which increase the maximum steady state operating temperature at which a graphite bursting membrane can reliably function.

The inventors have also found that improvements to a graphite bursting disc are possible which improve the corrosion resistance compared to the prior art thermo-setting resin impregnated graphite bursting discs.

According to one aspect of the present invention there is provided a pressure relief device comprising an unimpregnated graphite membrane having a gas impermeable coating.

Preferably the coating is a substantially non-micro porous coating.

The coating is preferably a surface coating bonded to the membrane.

The coating preferably comprises a polymer.

The coating may comprise a fluoropolymer.

The coating may comprise a fluoroalkyne.

The coating may comprise TEFLON® or polytetrafluoroethylene.

According to another aspect of the present invention there is provided a pressure relief device comprising an unimpregnated graphite membrane incorporating a fluoropolymer.

Preferably the membrane comprises a fluoropolymer surface coating.

The fluoropolymer may comprise TEFLON®.

The membrane may comprise a porous graphite membrane having a fluoropolymer surface coating.

Unlike the prior art devices, the graphite membrane of the device of the invention is not impregnated with a resin.

Preferably the coating is sintered to the graphite disc.

Preferably the coating is of thickness in the range 5 microns to 300 microns. The thickness may be in the range 25 to 125 microns.

The coating may be applied to one or more surfaces of the graphite membrane. The whole surface of the graphite membrane may be coated or one or more sides and edges of the membrane may be coated. In particular, the coating may be applied to the pressure side of the membrane only. This is equally effective and may reduce manufacturing costs and improve performance. Furthermore the disc may be machined to give the desired size or shape and to meet required tolerances after the coating process by machining or grinding the uncoated surfaces thereof.

Preferably the fluoropolymer coating is substantially holiday free.

Sintering the coating may have the effect of homogenising the fluoropolymer, and removing bubbles or micro cavities in the fluoropolymer, and thereby removing any holidays in the coating. By sintering the coating, the fluoropolymer coating may be made impermeable, and thereby promote pressure differential between opposite sides of the membrane, enabling an accurate bursting pressure to be designed for the membrane even if the body of the membrane remains porous.

Preferably the fluoropolymer coating and graphite disc are sintered at temperatures in the range 300–600° C., and suitably in the range 350–550° C.

The invention includes a method of manufacturing a fluoropolymer coated graphite membrane comprising:

coating an unimpregnated graphite membrane with a fluoropolymer in fluid form; and sintering the fluoropolymer coated graphite membrane.

The membrane may be machined or further machined to the desired size or shape either before or after the coating and/or sintering step.

Preferably said step of sintering comprises raising the temperature of the graphite membrane and fluoropolymer coating in the range 300–600° C., and suitably in the range 350° C. to 550° C. for a predetermined period.

A bursting disc incorporating such a membrane may be of the mono block type or of the replacement element type.

A fluoropolymer coated unimpregnated graphite bursting disc may have a steady state operating temperature in excess of 200° C. Further, as the fluoropolymer coating may have non stick properties, bursting discs made from the coated membrane may find new applications for example in industries where low contamination of product is an important criteria.

Since graphite is typically manufactured at some 3000° C., the only effective temperature limitation on a device of the present invention is the coating temperature unlike for impregnated graphite membranes which are limited in operating temperature to 165° C.

Apart from the improved operating temperature, the device of the invention has improved corrosion resistance and is more cost and time effective to produce since the process of impregnating the graphite is avoided.

Furthermore, the process of impregnation with for example furanic or phenolic resins renders the porous graphite impermeable. A porosity test can be performed to ensure the impregnated membrane complies with required standards. However, if a fluoropolymer coating is applied to the impregnated graphite, a porosity test will not indicate whether the coating is holiday free.

With the present invention however, a porosity test performed on the coated membrane gives a reliable indication of whether the fluoropolymer coating is holiday free since the graphite itself is unimpregnated and therefore porous. Thus, when a porosity test is completed successfully the fluoropolymer coating is holiday free.

The use of a non-micro porous fluoropolymer coating, produced for example by sintering, in an embodiment of the present invention gives an additional major advantage by providing the gas impermeable coating. Known fluoropolymer coatings applied to impregnated graphite are microporous so that their use is only effective with impregnated graphite which itself is non-porous.

BRIEF DESCRIPTION OF THE DRAWINGS

For a better understanding of the invention, and to show how embodiments of the same may be carried into effect, reference will now be made, by way of example, to the accompanying diagrammatic drawings, in which.

DETAILED DESCRIPTION OF THE INVENTION

Figure 3:
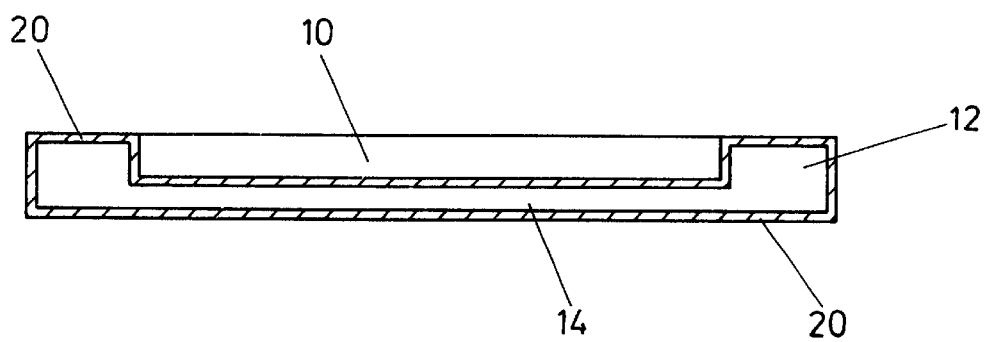
FIGS. 3 to 7 show in cut away side view bursting discs according to various specific embodiments of the present invention.

Referring to FIG. 3 of the accompanying drawings, there is shown in cut away side view a bisected graphite bursting disc according to a first specific embodiment of the present invention.

The graphite bursting disc is of the monoblock type and comprises a porous graphite disc cut from a billet of graphite, the disc comprising an outer ring portion 12, and a membrane 14 extending across the ring. The disc is formed from a block of graphite having a machined recess 10 centrally, the floor of the machined recess comprising the thin graphite membrane 14 which extends across the annular ring 12.

Figure 1:
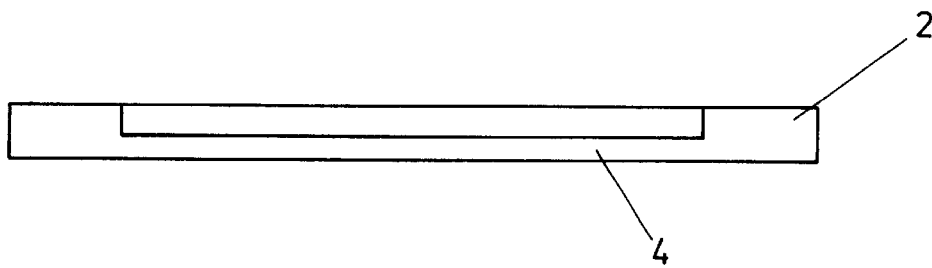
FIGS. 1 and 2 show prior art bursting discs.
Figure 2:
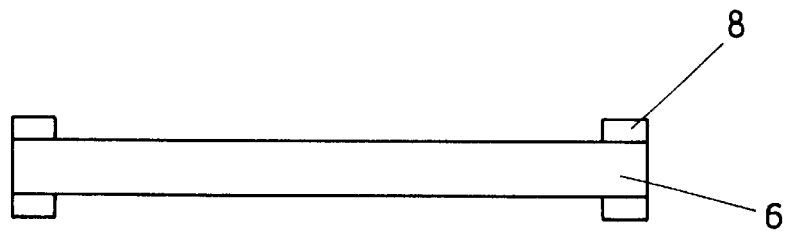

Although not shown in FIG. 2, the membrane may be recessed from both sides of the block, so that the outer ring portion 12 stands proud of the membrane 14 on both sides of the membrane. The disc may be held by a vacuum chuck when being machined on for example, a lathe or a surface grinder.

The disc is coated with a thin fluoropolymer coating 20, on each side of the membrane 14, and over the whole outer surface of the disc. The coating is gas impermeable and is bonded to the disc.

The graphite disc, being unimpregnated with a resin, is porous.

Figure 4:
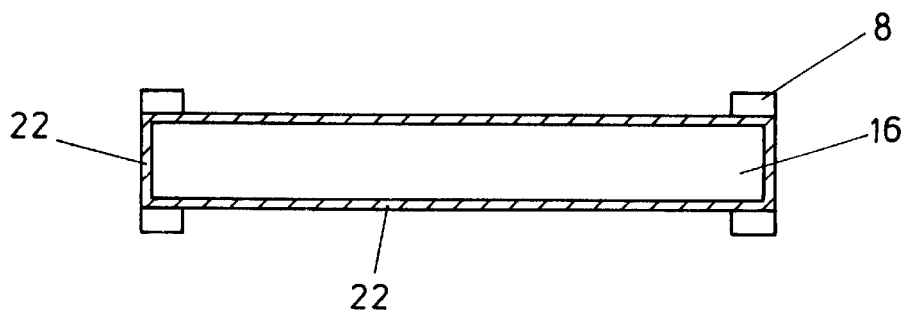

Referring to FIG. 4, a second embodiment of the present invention comprises a graphite bursting disc of the replacement element type comprising an unimpregnated graphite membrane 16 having a ring gasket 8 on either side thereof. The disc is coated over its whole surface with a thin fluoropolymer coating 22. The coating is gas impermeable and is bonded to the disc.

Figure 5:
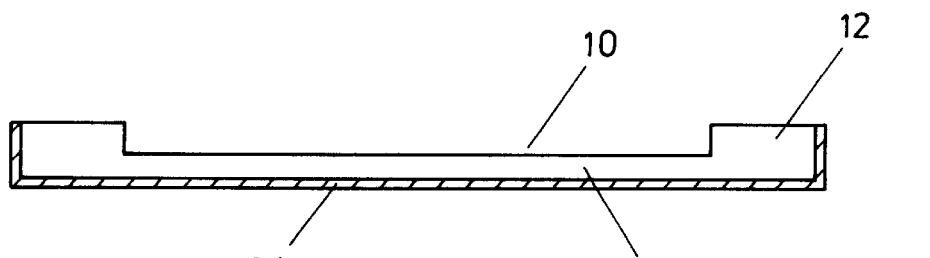
Figure 6:
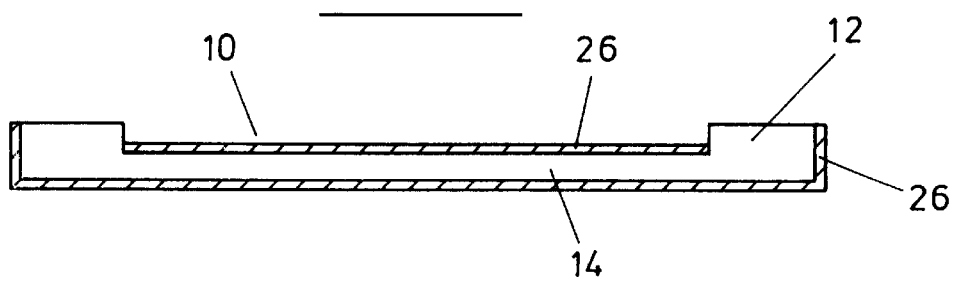

FIGS. 5 and 6 show alternative embodiments of the monoblock type having the coating applied over different parts of the outer surface of the disc. As shown in FIG. 5, the coating 24 is applied to the flat face and peripheral edges of the disc. Typically the coating will be applied to the face of the disc intended to withstand the higher pressure i.e. the pressure side face of the disc. As shown in FIG. 6, the coating 26 is also applied to the base of the recess 10 and to the peripheral edges of the disc.

Figure 7:
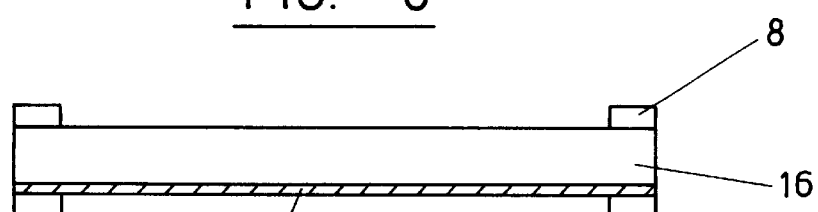

FIG. 7 shows an alternative embodiment of the replacement element type having the coating 28 applied to one side only of the membrane, typically the pressure side.

It will be appreciated that the present invention is not intended to be restricted to the details of the above embodiments which are described by way of example only. In particular, the coating may be applied to any suitable part of the outer surface of the disc or membrane.

A particular advantage of coating part only of the outer surface of the disc is that the uncoated surface or surfaces can be further machined after the coating process to ensure the required size, shape or tolerances are met without affecting the performance of the coated surfaces of the disc.

Figure 8:
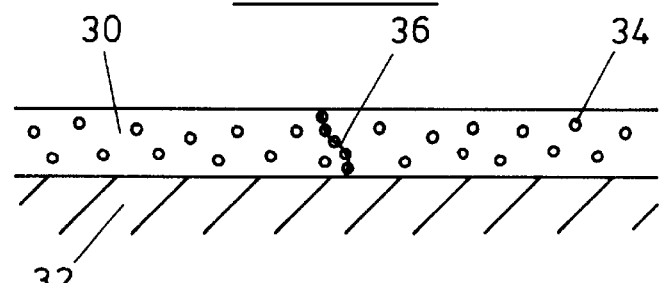
FIG. 8 shows in cross sectional view a portion of a pressure relief device of the invention prior to sintering.
Figure 9:
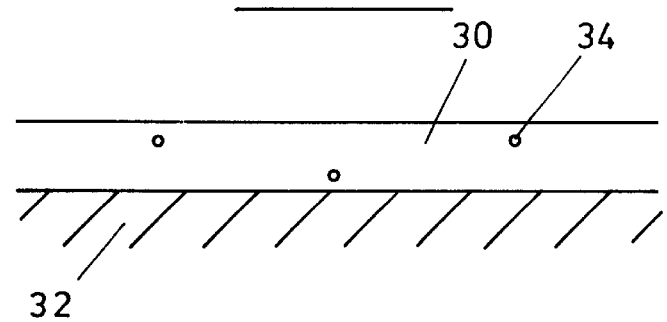
FIG. 9 shows in cross sectional view the portion of FIG. 8 after sintering.

Referring to FIGS. 8 and 9 of the accompanying drawings, a method of manufacture of the graphite bursting disc of the invention will now be described.

The graphite bursting disc is coated with a fluoropolymer in fluid form, for example, by spraying or painting the fluid onto the outer surface of the disc. The whole or part of the outer surface of the disc may be coated, preferably as described above in relation to the specific embodiments of FIGS. 3 to 7. It will be appreciated however that the device and method of the invention includes coating any part of the graphite membrane.

The disc may be suspended from a jig arrangement during the coating operation.

The thickness of the surface coating influences the bursting performance of the membrane. Coating thicknesses in the range from 1 thousandth of an inch to 5 thousandths of an inch (25 to 125 microns) has been found to give optimum performance, although thickness in the range 5 to 300 microns may perform adequately. The desired thickness may depend on the surface area covered and location of the coating on the membrane.

Once coated, the disc is sintered. The coating may be sintered in an inert atmosphere, for example helium. Sintering temperatures in the range 350° C. to 550° C. have been found optimum.

The disc may be machined or ground before, between or after the coating and sintering processes. In this respect the coating may be applied to part only of the surface of the disc so that the uncoated surfaces can be machined without affecting the disc performance. Alternatively one or more of the coated surfaces may be machined such that any remaining coated surfaces give the desired disc performance or embodiment.

Sintering the fluoropolymer coating is presently thought to have two important effects. Firstly, sintering bonds the surface coating to the outer surface of the graphite disc. This prevents the surface coating becoming dissociated from the graphite disc under the elevated operating temperatures at which the disc is used, which may typically be of the order of 350° C.

Secondly, sintering the coating has the effect of giving a gas impermeable property to the coating, by removing holidays from the coating.

Sintering the coating and disc may also have the effect of improving the corrosion resistance of the graphite membrane, as compared with the prior art thermo-setting resin impregnated types.

The exact mechanism by which sintering the coating improves the gas impermeability and bonds the coating to the graphite is not fully understood. The following description with reference to FIGS. 8 and 9 may describe schematically some of the actual mechanisms occurring, but the invention is not intended to be limited by the suggested mechanisms described with reference to FIGS. 8 and 9.

Referring to FIGS. 8 and 9, FIG. 8 shows schematically the fluoropolymer coating 30 prior to sintering, and FIG. 9 shows schematically the fluoropolymer coating 30 and graphite disc 32 after sintering.

In FIG. 8, a plurality of micro cavities, bubbles, and inhomogonaities 34 in the fluoropolymer coating are present. One holiday 36 is shown a holiday being a path of bubbles or micro cavities present in the coating layer, which may link with each other, or be separated from each other by such small distances, that they may link with each other under pressure, providing a micro-porous path through the fluoropolymer coating to the porous graphite material 32. To provide reliable bursting performance under pressure, such holidays need to be removed from the fluoropolymer coating. Such holidays need to be removed, since the effect of leaving the holidays in the fluoropolymer coating, is that the coating may be micro-porous or may become micro-porous under pressure, reducing the burst response time of the disc to rapid changes in differential pressure between opposite sides of the disc.

By sintering the graphite disc with the fluoropolymer coating, the occurrence of micro cavities and bubbles is reduced, and holidays are removed, and the sintered grahite disc may achieve the required gas impermeability to the fluoropolymer layer for reliable bursting performance of the disc.

By providing a graphite member having a sintered fluoropolymer coating, a graphite bursting disc which operates reliably at a temperature range up to the sintering temperature of the fluoropolymer may be provided. For example stable operation of a graphite bursting disc, with no dissociation of the fluoropolymer coating from the graphite, may be achieved under steady state conditions at a temperature of up to 350° C. or higher temperatures.

Further, since the fluoropolymer coating may comprise a non stick coating, eg. TEFLON®, the fluoropolymer coated bursting disc may be suitable for use in the food and drinks industry where low contamination of product and easy cleaning of equipment is of paramount importance.

Although a mono block type bursting disc has been shown as a first embodiment of the invention, other embodiments may comprise wafer membrane graphite discs for use as replacement elements to the replacement type bursting housings, or monoblock types having a membrane recessed from both faces of the ring.

Whilst specific embodiments according to the invention are described as having a fluoropolymer coating, any gas impermeable chemically inert surface coating which bonds to the outer surface of the graphite at elevated temperatures above 200° C. may achieve a similar result as the presently described embodiments, and such coatings are included within the scope of the invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of manufacturing a gas impervious bursting membrane for use as a pressure release device comprising the steps of:

providing a porous unimpregnated graphite membrane having a pressure surface and a surface opposite said pressure surface;

coating at least one of said surfaces of said unimpregnated graphite membrane with a fluoropolymer in a flowable state; and sintering the fluoropolymer coating on said at least one of said surfaces of said graphite membrane.

2. A method as claimed in claim 1 further comprising the step of machining the membrane to the desired size or shape either before or after the coating and/or sintering step.

3. A method as claimed in claim 1 wherein said sintering step further comprises the step of raising the temperature of the graphite membrane and fluoropolymer coating in the range 300–600° C. for a predetermined period.

4. A method as claimed in claim 3 wherein the step of raising the temperature comprises the step of raising the temperature in the range of 350° C. to 550° C. for a predetermined period.

5. A pressure relief device comprising an unimpregnated graphite bursting membrane having side and edge surfaces, a pressure side, and a gas impermeable coating applied only to said pressure side, wherein the coating comprises a fluoropolymer and is a surface coating sintered to the membrane.

6. A pressure relief device as claimed in claim 5 wherein the coating comprises polytetrafluoroethylene.

7. A pressure relief device as claimed in claim 5 wherein the membrane comprises a porous graphite membrane.

8. A pressure relief device as claimed in claim 5 wherein the coating is of a thickness in the range of 5 microns to 300 microns.

9. A pressure relief device as claimed in claim 8 wherein the thickness is in the range of 25 to 125 microns.

10. A pressure relief device as claimed in claim 5 wherein the coating is holiday free.

11. A pressure relief device as claimed in claim 5 wherein the coating and graphite disc are sintered at temperatures in the range of 300–600° C.

12. A pressure relief device as claimed in claim 11 wherein the coating and graphite disc are sintered at temperatures in the range of 350–500° C.

13. A bursting disc incorporating such a pressure relief device as claimed in claim 5, said bursting disc being of the mono block type or of the replacement element type.

14. A bursting disc as claimed in claim 13 having a steady state operating temperature in excess of 200° C.

* * * * *